United States Patent Office 2,928,421
Patented Mar. 15, 1960

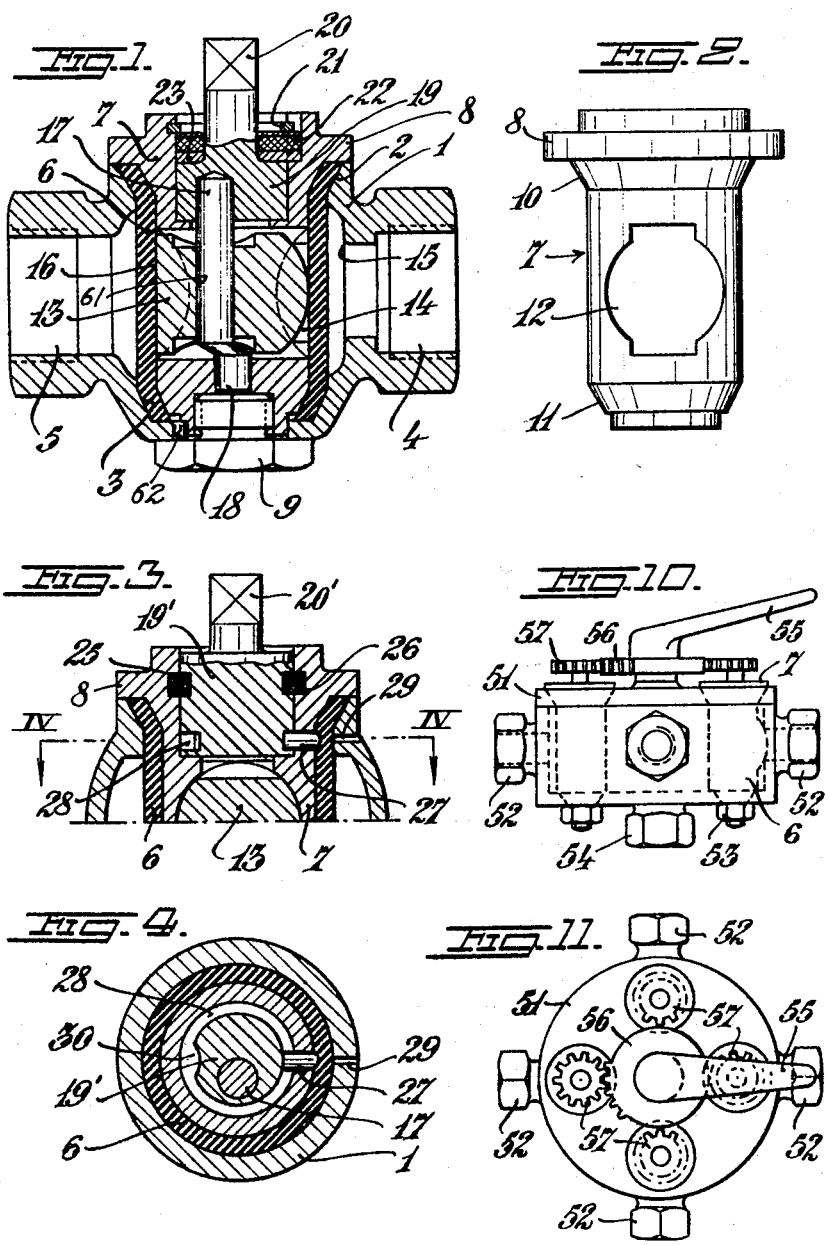

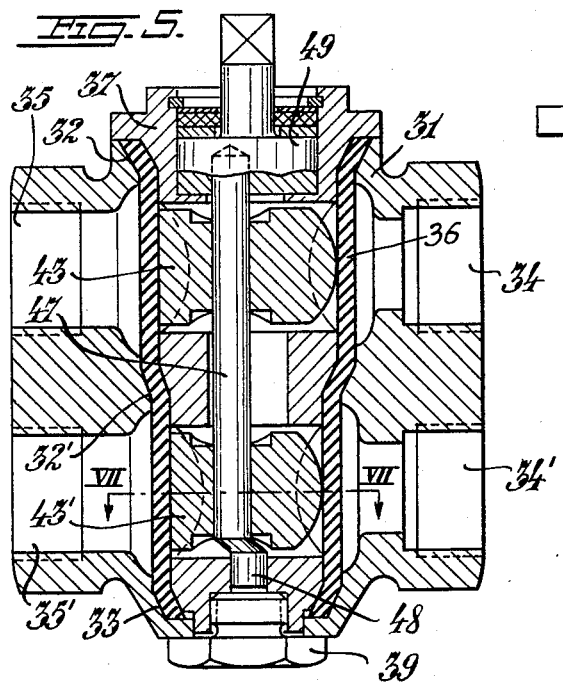
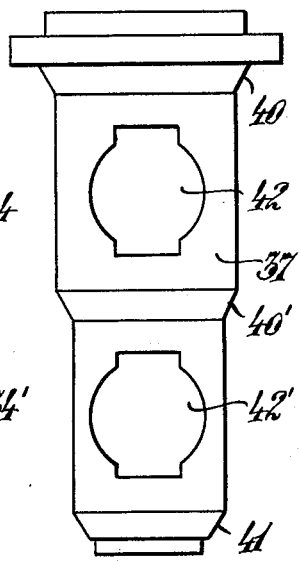
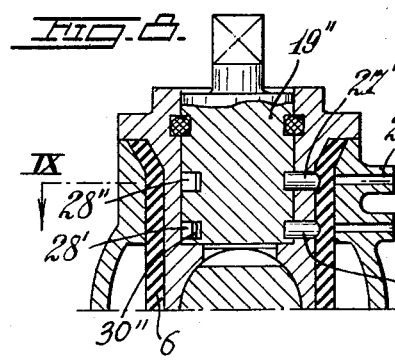
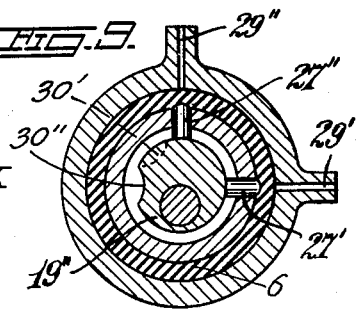
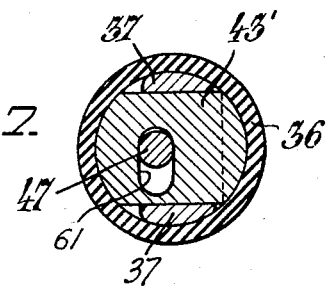

2,928,421

VALVES

Sven-Gösta Nordstrand, Vallentuna, Sweden, assignor to Aktiebolaget Nordstrandsventilen, Stockholm, Sweden, a corporation of Sweden Application June 22, 1956, Serial No. 593,170

Claims priority, application Denmark June 25, 1955

4 Claims. (Cl. 137—595)

The present invention relates to valves of the type having a hollow resilient body or sleeve mounted in a housing so that a passage is formed around said hollow body while its interior is permanently separated from said passage by the encircling resilient sleeve and includes a member movable for urging the wall of the hollow resilient body against a seat in the wall of the valve housing.

It is known to provide such valves with a tubular body of resilient material having both ends secured to the valve housing and a ballshaped member movable by an eccentric within said tubular body. The ball shaped member is confined by opposite covers. Due thereto the several separate elements of the mechanism must be mounted from opposite sides of the housing which is generally troublesome. Furthermore in many cases it is impossible to replace said element without removing the housing from the pipe line, which is often very difficult and expensive.

The main object of this invention is to provide a valve of the type described in which the operating mechanism and the resilient body is made as a separate unit that may be installed in an arbitrary housing having seats provided in predetermined positions relative to the installed units.

Said unit comprises according to the invention an inset member adapted to extend substantially through said housing and guide mechanism for said operating means for displacing the sidewall of the surrounding resilient body a predetermined distance.

Suitably the end margins of said resilient body are frustoconical in the same sense so that said unit may be installed in the housing from one side thereof with said frustoconical parts permanently urged into tight engagement with the housing between correspondingly shaped frutoconical parts of the inset and the housing.

Said inset may extend entirely through the housing and be fastened at the opposite side thereof by threaded means or it may only extend through a portion thereof while being fastened at the same side from which the inset member is installed. In the latter case the hollow body may be provided with a bottom.

The invention admits also of the provision of combined valve means including two or more separate passages to be controlled by its own movable member operated by common operating means, such as a crankshaft or the like. Moreover, according to the invention an arbitrary number of inset members surrounded by resilient bodies as described above may be installed in one and the same housing having a corresponding number of passages against the seats of which the respective resilient bodies may be urged to tighten the openings.

Another object of the invention is to provide one or more similar valve means in one and the same inset member for controlling passages through the wall of the valve housing at predetermined angular positions of the operating means. Thereby it is possible to drain the valve housing and corresponding part of the pipe line, when the valve member closes the main passage through the housing. Furthermore such additional valve means may be used for indicating the position of the valve operating means or supply the fluid in the valve housing to desired places at predetermined positions of the operating means.

The movable valve member is preferably guided to perform a straight line motion to and from said seat. Thereby the resilient body will only be compressed and no wear is to be found on the surface thereof. Even 60,000 operations in practical use have not caused any visible wear of said resilient body.

Further objects and advantages will be apparent from the following description of some embodiments and applications given on the annexed drawings as examples only without restricting the invention thereto.

In the drawings:

Fig. 1 is an axial sectional view of a valve according to my invention.

Fig. 2 is an elevational view of an inset member seen at right angle to the sectional view in Fig. 1.

Fig. 3 is a fragmental sectional view showing additional valve means according to the invention.

Fig. 4 is a cross sectional view taken along line IV—IV in Fig. 3.

Fig. 5 is a sectional view similar to that in Fig. 1 of combined valve means according to the invention.

Fig. 6 is an elevational view of the inset member shown in Fig. 5.

Fig. 7 is a cross sectional view taken along line VII—VII in Fig. 5.

Fig. 8 is a fragmental sectional view similar to that in Fig. 3 of a modified embodiment.

Fig. 9 is a cross sectional view taken along line IX—IX in Fig. 8.

Figs. 10 and 11 are schematic views of combined valve means including several separate inset members provided in a common valve housing.

Referring now to Figs. 1 and 2 a valve housing 1 comprises a substantially spherical shell provided with two perpendicular pairs of openings 2, 3 and 4, 5 respectively. One pair 2, 3 of said openings is of relatively large diameter and provided with frustoconical seats having their apices turned in the same direction, said seats serving a purpose described below. The other pair 4, 5 of openings are threaded to form pipe fittings. One of said latter openings 4 is within the housing provided with a seat 15 parallel to the axis of the openings 2, 3.

A tubular body or sleeve or tube shaped member 6 of resilient material, such as natural or artificial rubber is inserted in the valve housing through the opening 2. The end margins of the sleeve 6 are frustoconically shaped in correspondence with the shape of said frustoconical seats 2, 3 in the housing.

A cylindrical body or inset member 7, Fig. 2, provided with a flange 8 at its one end extends through the sleeve 6 with its flange 8 resting against a rim portion around said opening 2. The inset member 7 is secured by a screw member 9 that is threaded in a bore in the opposite end of the inset member 7 and with its head resting against the opposite side of the housing. The inset member is provided with upper and lower frustoconical seats 10, 11 corresponding to the seats 2, 3 in the housing for urging the sleeve portions tightly against said seats 2, 3 thereby providing a tight channel around said sleeve 6 from one pipe fitting 4 to the other 5.

The cylindrical inset member 7 has a central bore 12, Fig. 2, at right angle to the axis of the cylinder to receive a movable cylindrical member 13. One end part 14 of said movable member 13 is spherical. Said spherical part 14 is adapted to be in register with the seat 15 and to urge said resilient sleeve 6 into tight engagement with said seat 15.

The opposite end 16 of said movable member 13 is preferably cylindrically shaped corresponding to the peripheral surface of the cylindrical body 7 so that the movable member 13 in the position shown in Fig. 1 forms a substantially unbroken cylindrical surface (compare also Fig. 7) for supporting the rear wall of the sleeve 6, while the spherical portion 14 supports the front wall of the same.

The intermediate portion of the cylindrical body 7 is shaped as shown in broken lines in Fig. 1 to permit the rear wall of the sleeve 6 to be displaced as the movable member 13 displaces the front wall of the sleeve into engagement with the seat 15. Thereby the displacement of the sleeve 6 may be carried out with only a slight stretching, or without any stretching, of the peripheral length of the resilient sleeve 6. The stretching of the resilient material in axial direction may be suppressed or eliminated by precompression of the sleeve 6. This may be obtained by simply giving the sleeve 6 a greater length than corresponding parts of the housing.

For moving the member 13 relative to its seat 15 a crank shaft or crank pin 17 is rotatably mounted in the cylindrical body or inset member 7 and extends through a bore 61 in the movable member 13 having an enlarged width at right angle to the direction of movement of the movable member 13 (see Fig. 7). Thereby the crank pin 17 (Fig. 1, or 47 of Fig. 7) may be moved sideways when turned to guide the member 13 (43') along a straight line path throughout its motion.

In order to secure the cylindrical inset member 7 in correct angular position relative to the seat 15 a short pin 62 is provided apportioned equally between the housing 1 and the cylindrical inset member 7 respectively.

The crankshaft 17 shown is built up of several parts. The proper crank pin 17 is integral with a stub shaft 18 forming a lower pivot for the crankshaft. The opposite end of the crank pin 17 is secured to an enlarged cylindrical member or portion 19 that is rotatably mounted in the upper portion of the inset member 7. Said cylindrical portion 19 is secured against axial movement and has a projecting shaft 20 of reduced diameter as compared to the portion 19, and is provided with a square shaped portion for fastening a handle or the like thereto. Of course a handle (not shown) may instead be integral with said portion 19. Due to the fact that the pressure fluid in the valve housing surrounds the sleeve 6 all around, no forces produced by any static pressure need to be overcome when operating the valve. The only force to be overcome is that produced by the pressure drop as will be easily understood by a person skilled in the art. As is further obvious the increasing force due to the increasing pressure drop during the closing movement of the movable valve member will be compensated to a considerable extent by the increasing lever ratio between the handle and the crank pin.

However, the operating means of the valve are too easily movable under certain conditions so that the crankshaft 17—19 will not remain in its adjusted position. In these cases frictional means, such as annular disks 22, 23 (Fig. 1) secured in place by clamping means 21 may be used. As shown in Fig. 3 a rubber ring 25 of circular cross section may be inserted in opposite annular grooves 26, said grooves having a smaller cross section than that determined by the diameter of said rubber ring 25. Thus the rubber ring 25 will be compressed and will frictionally engage the surfaces of said grooves 26.

In many cases one desires to drain the housing and the pipe line in communication therewith, especially when the valve is used for compressed air pipelines, in plants where the pipe line must be emptied to permit disconnection of boring machines or the like. By the arrangement shown in Figs. 3, 4 and 8, 9 this is accomplished. A small portion of the wall of the housing is thickened adjacent to the surface of the sleeve 6. A bore 29 leads through the thickened portion from the outside to said surface within the housing. A pin 27 registering with said bore 29 is movably mounted in the upper portion of the inset member 7. The rear end of the pin 27 extends into an annular groove 28 in the enlarged cylindrical portion 19', said groove being of such a depth as to urge the pin normally into engagement with the sleeve 6 sufficiently to close the bore 29. At a predetermined angular position corresponding to the closed valve position, said groove has a depression 30. When said depression 30 is angularly moved into register with said pin 27 the latter may move backwards and release the engagement of said sleeve 6 with said bore 29, so that the fluid in the housing may bleed out through said bore 29.

In Figs. 8, 9 a modified arrangement is shown having several bores 29', 29" at various angular positions and different levels. The enlarged cylindrical member 19" is provided with for instance two annular grooves 28' and 28" one above the other. A pin 27 extends into the lower groove 28', said pin being in register with a bore 29'. The arrangement corresponds to that described above and a depression 30' shown by dotted lines in Fig. 9 permits the release of said opening 29' in the thus determined angular position.

In register with the upper groove 28" two bores 29' and 29" are located at right angles to be normally closed by pins 27', 27" extending into the groove 28". A depression 30" shown in Fig. 9 may be successively brought into register with said pins 27", 27' to release the respective openings 29", 29'.

It is to be noted that the bores 29 and pins or valve members 27 may be given any dimension permitted by the dimensions of the housing.

In Figs. 5, 6 and 7, a combined valve according to the invention is shown. This valve includes two movable members 43, 43' each controlling its own passage 34, 35 and 34', 35' respectively. Each opening 34, 34' is as above described provided with its own seat in register with said movable members 43, 43'. A cylindrical inset member 37 (Fig. 6) extends through the combined housing 31 and includes the movable members 43, 43' and a crankshaft 47 common to both movable members 43, 43'. Said crankshaft is rotatably mounted in the housing at its lower portion 48 and upper portion 49. A common resilient sleeve 36 surrounds the inset member 37 in correspondence with the above description. The housing 31 and the cylindrical inset member 37 are provided with cooperating frusto conical surfaces 32, 32', 33 and 40, 40', 41 respectively for urging correspondingly shaped portions of said sleeve 36 into tight engagement with the housing 31 so that the latter is subdivided into two separate closed annular channels. A screw 39 secures the inset member 37 to the housing 31.

It is to be noted, however, that the number of conduits is not limited to two, and there may be combined three or more conduits. Moreover the movement of the separate movable members 43, 43' need not follow each other but may be "phase shifted" so as to close in different angular positions. Furthermore the movable member 43 or 43' may be adapted to close against seats of opposite openings. In Figs. 10 and 11 a further application of the invention is illustrated as an example only. According to this embodiment several, for instance four insets 7 surrounded by resilient sleeves 6 are installed in a hollow body or housing 51 of circular shape, although it may instead be of arbitrary shape. The insets which include the operating elements described above are located in register with the openings of the pipe fittings 52 and at a predetermined distance therefrom. Nuts 53 hold the inset members in place. The housing 51 is provided at the bottom with a pipe fitting 54.

The operating shafts are shown as being provided with gear wheels 57 cooperating with a toothed segment of a central wheel 56 that is operated by a handle 55. However, this solution is only shown as by way of example when one is required to operate the various valve inset members successively. The arrangement may instead be carried out in any other suitable manner, such as with separate operating means for each valve inset member.

In Fig. 10 the left hand valve means is open while the right hand valve means is closed.

Although some embodiments of my invention are described and shown on the drawings any modification may be made within the scope of the appended claims. Thus the hollow resilient sleeve 6, 36 may be furnished with a closed bottom. The inset member 7, 37 may be secured to the housing at the same side from which it is installed in the housing.

It is expressly noted that an essential feature of the invention is that the inset member and its surrounding body of resilient material may be carried out as a unit adapted to be inserted in a housing of arbitrary shape provided there is a seat within the housing in register with said movable member 13, 43. The housing may thus be carried out in the proper pipe line or any other object containing channels to be controlled by said inset member, since said seat will never be affected and destroyed by said resilient body. The elements that may be worn out are all contained in or form a part of said easily exchangeable unit comprising the inset member and its surrounding rubber sleeve.

An essential advantage of the present invention is that when a fluid jet strikes a cylindrical body at right angle thereto the jet is divided into two streams following the round circumference of said cylindrical body and meeting at the opposite side thereof. At that point said two streams are joined to a single stream of substantially the same shape as the original jet. This streaming condition is performed without practically any appreciable pressure losses.

It may also be mentioned that the cross section of the movable element may take up various shapes such as rectangular, oval, polygonal etc. By forming the movable member with greater height than width valves, especially large valves may be constructed with relatively small lateral dimensions which may be important when the pipe lines are drawn adjacent to wall surfaces or the like.

Finally it may be mentioned that the valve housing may be made of any suitable material, such as metal, glass, rubber, plastic and the like that may be moulded without any subsequent forming. Slight incorrectness may be easily compensated by changing the crankshaft to one having a suitable eccentricity. When made of rubber or rubberlike material the resilient sleeve may be made integral with the housing. However, it may be noted that the same inset member may be used in all cases as the space including said inset is permanently separated from the passage of the fluid to be controlled by the valve.

What I claim is:

1. A valve device comprising in combination a valve casing having inlet and outlet openings, a cylindrical inset unit inserted into said casing through the wall thereof with its axis transverse to the axis of one of said openings, a sleeve of resilient material surrounding said inset unit, said inset unit and said sleeve being of such relative dimensions as to leave within said casing a space about the sleeve, a member guided throughout its movement for transverse movement in said inset unit and being reciprocably movable rectilinearly for urging a portion of said sleeve into tight engagement with said one opening, a mechanism disposed within said inset unit operable for moving said member from outside, cooperating means on said inset unit and said casing for sealing said sleeve against the wall of said casing, and means for securing said inset unit to said casing.

2. A valve device for fluid comprising in combination a valve casing having several pairs of inlet and outlet openings, a cylindrical inset unit inserted into the casing through the wall thereof with its axis transversely to the axis of one of said openings of each pair, a sleeve of resilient material surrounding said inset unit, said sleeve and the wall of said casing defining a space about the sleeve for normally guiding the fluid around said sleeve, means in said inset unit movable for urging portions of said sleeve into tight engagement with said one of said openings, cooperating means on said inset unit and said casing for sealing said sleeve against the wall of the casing through which the inset unit is inserted and intermediate said pairs of openings to subdivide the casing into several separate passages, each passage interconnecting a respective pair of inlet and outlet openings, and means for securing said inset unit to said casing.

3. In a valve device as claimed in claim 2 the further feature that said movable means are adapted to be moved at different positions of said cooperating means.

4. A valve device comprising, in combination, a valve casing having inlet and outlet apertures, a tube shaped member of resilient material disposed within said casing insertable into and removable from said casing at one side thereof and when emplaced extending transverse to the axis of one of said apertures and defining with the internal wall surface of the casing a space surrounding said member between said apertures, the interior of said tube shaped member being separated from said surrounding space, rigid means disposed within said tube shaped member and having substantially the same external shape as the interior of said tube shaped member and defining an internal transverse passage extending throughout said tube shaped member coaxially aligned with said one of said apertures, a member slidable along a straight path in said passage and being guided for straight movement by the walls of said passage and bearing against opposite wall portions of said tube shaped member, and eccentric means operative from outside of said casing for moving said slidable member and the corresponding portion of the wall of said tube shaped member into and out of sealing engagement with said one of said apertures.

References Cited in the file of this patent

FOREIGN PATENTS

| | | |
|---|---|---|
| 143,999 | Sweden | Feb. 9, 1954 |
| 713,999 | Great Britain | Aug. 18, 1954 |
| 720,664 | Great Britain | Dec. 22, 1954 |